United States Patent
Schreter

(10) Patent No.: US 7,464,100 B2
(45) Date of Patent: Dec. 9, 2008

(54) REORGANIZATION-FREE MAPPING OF OBJECTS IN DATABASES USING A MAPPING CHAIN

(75) Inventor: Ivan Schreter, Leimen (DE)

(73) Assignee: SAP AG, Walldorf (DE)

( * ) Notice: Subject to any disclaimer, the term of this patent is extended or adjusted under 35 U.S.C. 154(b) by 646 days.

(21) Appl. No.: 10/745,776

(22) Filed: Dec. 24, 2003

(65) Prior Publication Data

US 2005/0149472 A1    Jul. 7, 2005

(51) Int. Cl.
*G06F 17/30* (2006.01)
(52) U.S. Cl. .................... 707/101; 707/102
(58) Field of Classification Search .............. 707/1–10, 707/100–104.1, 200–206; 709/225; 711/118, 711/209, 170; 345/564, 566; 370/397, 399
See application file for complete search history.

(56) References Cited

U.S. PATENT DOCUMENTS 6,591,340 B2 *   7/2003   Chopra et al. ............... 711/118
2002/0073110 A1 *   6/2002   Duvillier et al. ............ 707/206
2003/0115324 A1 *   6/2003   Blumenau et al. ........... 709/225
2004/0186976 A1 *   9/2004   Bayt ........................... 711/170

* cited by examiner

*Primary Examiner*—Diane Mizrahi
(74) *Attorney, Agent, or Firm*—Fountainhead Law Group PC

(57) ABSTRACT

Methods and apparatus, including computer program products, for addressing data in a database. One method includes storing a physical address of a data object in a mapping item having an item address, and identifying the data object by that item address. If the data object is moved to a second physical address, the second physical address is stored in the item. The item can be contained within a mapping page, and the item address can be derived from an address within the mapping page. The item address can be stored with the data object and can be stored in database indices to identify the data object. One method for accessing a data object includes reading an identifier for the data object, obtaining a mapping item address from the identifier, reading a physical address from the mapping item address, and then accessing the data object using the physical address.

10 Claims, 6 Drawing Sheets

REORGANIZATION-FREE MAPPING OF OBJECTS IN DATABASES USING A MAPPING CHAIN

BACKGROUND

The present invention relates to data processing by digital computer, and more particularly to computer systems, programs, and methods for addressing data in databases.

Database systems commonly allocate data space in fixed-sized pages that are generally a few kilobytes in size. Variable-sized data objects are stored in these pages. Databases are usually not static—the data objects are often modified, changed in size, deleted, moved to other data pages, and so on. Data objects can contain references to other data objects. For these reasons, databases require some form of data object identifier and an addressing scheme.

Generally, addressing data objects in a database (e.g., table rows) using object identifiers (e.g., in table indices) can be done in two ways; using either a physical address or a logical object identifier for the data object. Storing the physical address has obvious problems. For example, when the data object is moved to a different location in the database, the database system must update references to the data object in all other data objects that point to the moved data object. Alternatively, the database system must add a secondary reference to the data object in the original storage location, thereby extending the path needed to find the data object, which makes retrieving the data object less efficient and consumes space in the original storage location.

Using logical identifiers frees the database system from the need to update all references to the data object or store a secondary reference in the original storage location. The trade off is the cost of navigating some form of mapping structure, which must be updated whenever a data object is moved, that maps the logical identifier to the physical address. Some systems, for example, assign sequential identifiers to data objects and use B*-trees or multi-level mapping arrays to address the data objects.

SUMMARY

The invention provides methods and apparatus, including computer program products, that require only a single access to a mapping structure to map a data object identifier to a physical address within a database, while maintaining reorganization freedom for moving data objects in the database as necessary. By "physical address", in this context, is meant the address used by the database system as the physical address, which is not necessarily the address used by the underlying data storage hardware.

In general, in one aspect, the invention features a computer program product, tangibly embodied on an information carrier, having instructions that are operable to cause data processing apparatus to store a data object at a physical address in a database; store the physical address in a mapping item, the mapping item having a mapping item address; and use the mapping item address as an identifier for the data object. The invention can be implemented to include one or more of the following advantageous features. The product has instructions to update the physical address stored in the mapping item whenever the physical address of the data object in the database changes. The mapping item is stored on a mapping page in a mapping chain. The mapping item address is made up of a page identifier for the mapping page and a location within the mapping page. The product has instructions to convert the page identifier and the location to a bit position and set a bit at the bit position in a bit array, and instructions to use the bit array as a bitmap index. The product has instructions to store the mapping item address with the data object; store a logical identifier for the data object along with the physical address of the data object in the mapping item; and use the physical address to access the data object, and if the data object is not at the physical address, use the logical address to access the data object. The data object is a row in a database table, the product has instructions to store the mapping item address in a field in the row.

In general, in another aspect, the invention features a computer program product, tangibly embodied on an information carrier, having instructions operable to cause data processing apparatus to maintain a mapping page structure of mapping pages and mapping items to provide identifiers for data objects in a database, each mapping item having a mapping item address and being in a mapping page, and each data object having a physical address in the database, the physical address of each data object being stored in a corresponding mapping item; and to use, as the identifier of each respective data object, the mapping item address of the mapping item storing the physical address of the respective data object. The invention can be implemented to include one or more of the following advantageous features. The product has instructions to access a data object by using its identifier to read a physical address from the mapping page structure and using the physical address to access the data object. The mapping page structure includes a chain structure of mapping pages, each mapping page providing a fixed number of mapping item locations; and the mapping structure also includes metadata for the chain structure. The product has instructions to generate a bitmap for a set of data objects by converting the identifier for each data object in the set to a bit position in a bit array.

In general, in another aspect, the invention features a computer program product, tangibly embodied on an information carrier, having instructions operable to cause data processing apparatus to process a request to access a data object in a database maintained by a database management system, the request identifying the data object by an identifier that includes a mapping item address that specifies the location of a mapping item by reading a physical address in the mapping item at the mapping item address and using the physical address to access the data object. The invention can be implemented to include one or more of the following advantageous features. The product has instructions to determine whether the correct data object has been accessed by comparing a mapping item address stored with the data object to the mapping item address of the identifier of the data object.

In general, in another aspect, the invention features a system for providing access to data objects. The system includes a database management system for managing data objects in a database; and means for identifying data objects in the database management system by using mapping item addresses of mapping items as identifiers for corresponding data objects, each mapping item address used as an identifier being the address of a mapping item holding the physical address in the database of a corresponding data object. The invention can be implemented to include one or more of the following advantageous features. The system includes means for generating a bitmap for a set of data objects by converting the identifier for each data object in the set to a bit position in a bit array. The data objects are rows in a database table, and the system includes means for storing mapping item addresses in a field in the corresponding rows. The mapping items are organized in a mapping page chain structure of mapping pages, with each mapping page providing a fixed number of mapping item locations. The means for identifying data objects include means for updating the physical addresses stored in mapping items whenever the physical addresses of data objects in the database change.

In general, in another aspect, the invention features a method for providing identifiers for data objects in a database. The method includes providing for each data object in the database a corresponding mapping item, each data object having a physical address in the database, each mapping item having a mapping item address; storing the physical address of each data item in the corresponding mapping item; and using, as the identifier of each respective data object, the mapping item address of the mapping item storing the physical address of the respective data object. The method can further include maintaining a mapping page structure of mapping pages, each mapping item being in a mapping page.

The invention is well suited for relational databases with tables and table records as data objects. Table records can be addressed from indices with minimal overhead, while maintaining reorganization freedom of the underlying table. In one implementation, the database records are stored directly in a primary key B*-tree and can move quite often.

These and other features and advantages of the invention will be apparent upon consideration of the following detailed description, the drawings, and the claims. Certain features of the invention that are described below in the context of separate implementations can also be provided in combination in a single implementation. Conversely, certain features of the invention that are described in the context of a single implementation can also be provided separately or in any subcombination. Accordingly, there are any number of alternative combinations for defining the invention, which incorporate one or more elements from the description, claims, and drawings in various combinations or subcombinations. Thus, the described combination of the features of the invention is not be understood as a limitation, and features can be combined in other configurations without departing from the essence of the invention. Both the foregoing general description and the following detailed description are exemplary and explanatory only and are not restrictive of the scope of the invention.

DESCRIPTION OF THE DRAWINGS

Like reference symbols in the various drawings indicate like elements.

DETAILED DESCRIPTION

Figure 1A:
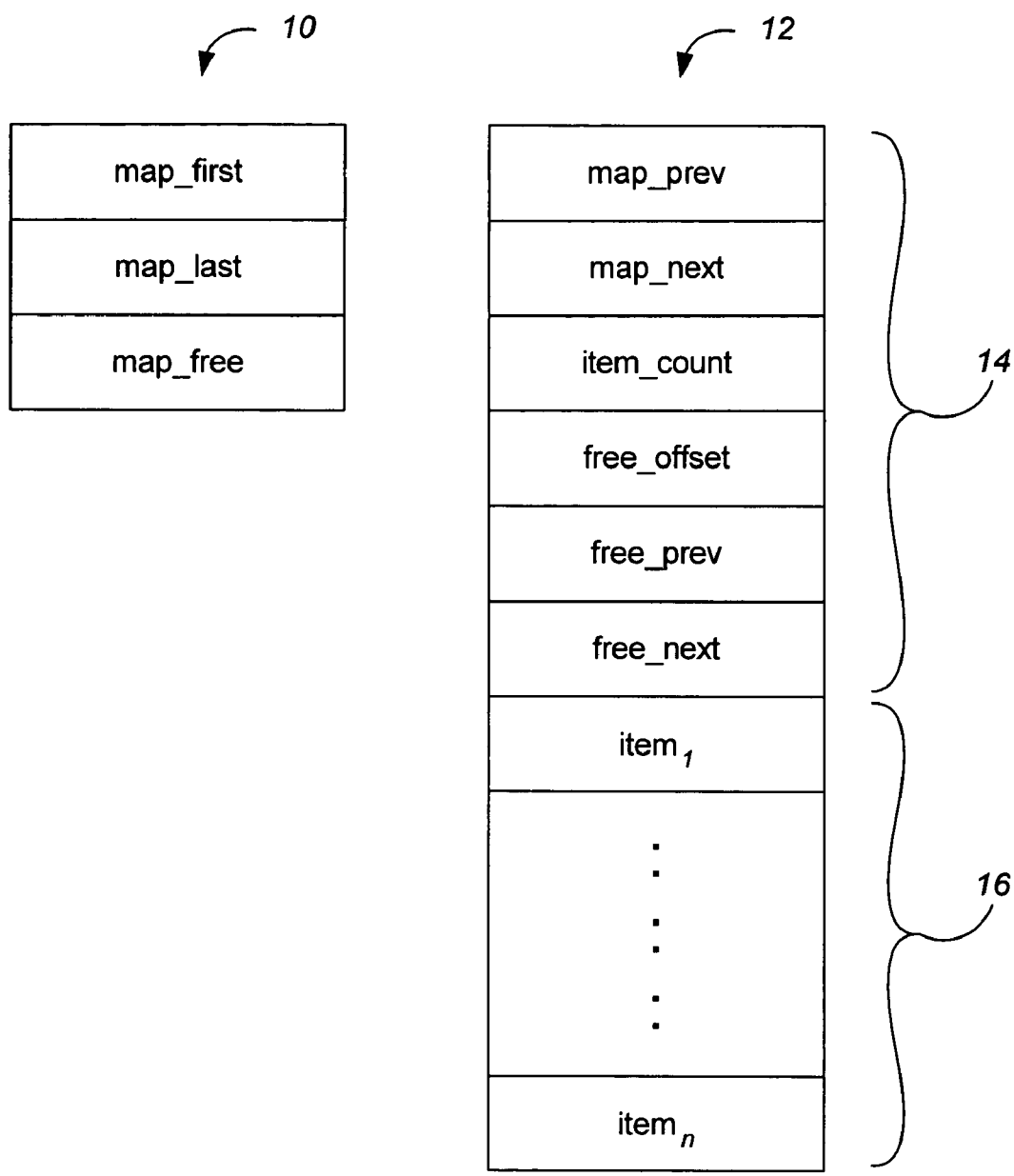
FIG. 1A is a block diagram showing mapping chain metadata and the structure of a mapping chain page.

FIG. 1A shows the structure of mapping chain metadata 10 and of each mapping page 12 in one implementation of a mapping chain of mapping pages in accordance with the invention. The mapping chain can be implemented for an entire system, or it can be implemented for a particular part of a database, e.g., a table in a relational database. The mapping pages in the mapping chain are static—that is, they do not move. Each page can be addressed by a page identifier. This can be the page identifier used by the database, or it can be a zero-based identifier used and managed by the implementation of the mapping chain mechanism, for example, by using the zero-based identifier as an index.

The mapping chain metadata 10 includes the following data: map_first, a page identifier for the first page of the mapping chain; map_last, a page identifier for the last page of the mapping chain; and map_free, a page identifier for the first page of the mapping chain with a free item, if there is such a page, or a special value such as −1, if there is not.

Each mapping page in this implementation has a header 14 of six fields. The page identifiers map_prev and map_next identify the previous and next pages in the mapping chain. The page identifiers free_prev and free_next identify the previous and next pages in the mapping chain that have a free item (the fields contain a null value such as −1 if there are no such pages). The integer item_count counts the number of allocated items on the page. And free_offset is the offset of a free item in this page (or a null value such as −1 if there is none). Each mapping page also has number of items 16 for storing pointers to (physical addresses of) data objects.

Free items are kept in free lists. A single free list could be maintained for the mapping chain; however, to ensure good locality of mapping entries, free lists are maintained on each page, and each mapping page has pointers—free_next and free_prev—to the next and previous mapping pages, respectively, that have free items. The offset free_offset contains the offset within the page of a first free item. Each free item contains a null value if it is the last free item on the page; otherwise, it contains the offset of the next free item on the page.

Figure 1B:
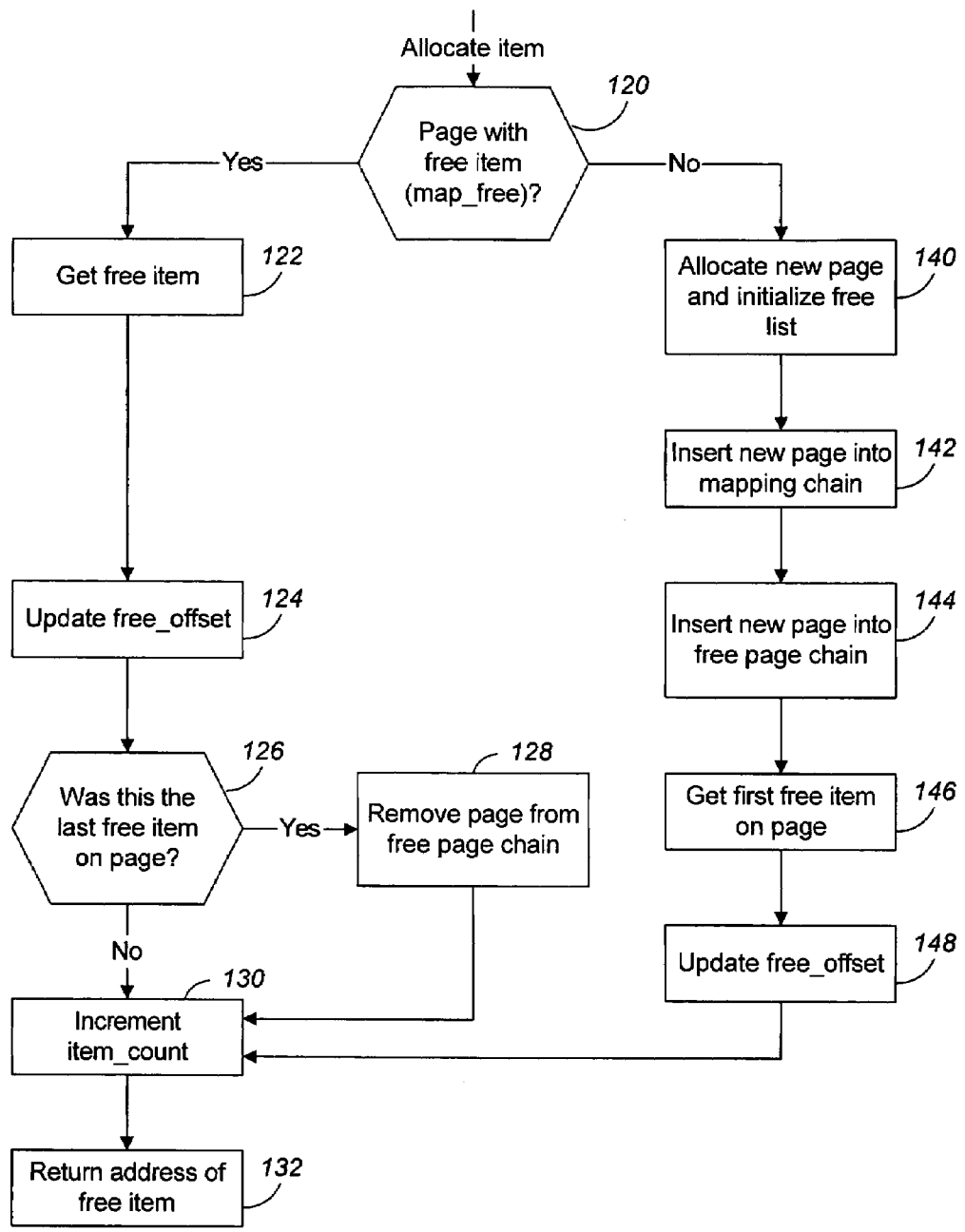
FIG. 1B shows a method for allocating an item in a mapping chain.

When a new data object is added to the database, a new entry must be allocated in the mapping chain. FIG. 1B illustrates one method of doing so, which operates on a mapping chain having the structure described in reference to FIG. 1A.

If there is a page with a free item (i.e., if map_free points to a page) ("yes" branch from decision 120), the system gets the free item on the page (122) from the free_offset pointer and updates free_offset with the value in the free item (124). If the free item was the last free item on the page ("yes" branch from decision 126), the system removes this page from the free page chain (128). That is, the map_free pointer is updated to point to free_next and the pages free_prev and free_next are linked to each other. In any event, the item_count for the page is incremented (130) and the item address (e.g., mapping page identifier and offset within the page) of the free item is returned (132).

If no page in the mapping chain has a free item ("no" branch from decision 120), a new mapping page is allocated and its free list is initialized (140). The new page is inserted into the mapping chain (142). This can be done most easily by making it either the first (map_first) or the last (map_last) page in the chain. The new page is also inserted into the free page chain, by updating the pointers map_free, free_prev free_next as appropriate (144). The first free item is taken from this new page (146), and the free_offset pointer is updated (148). The item_count is incremented and the address of the free item is returned, as has been described (130, 132).

Figure 1C:
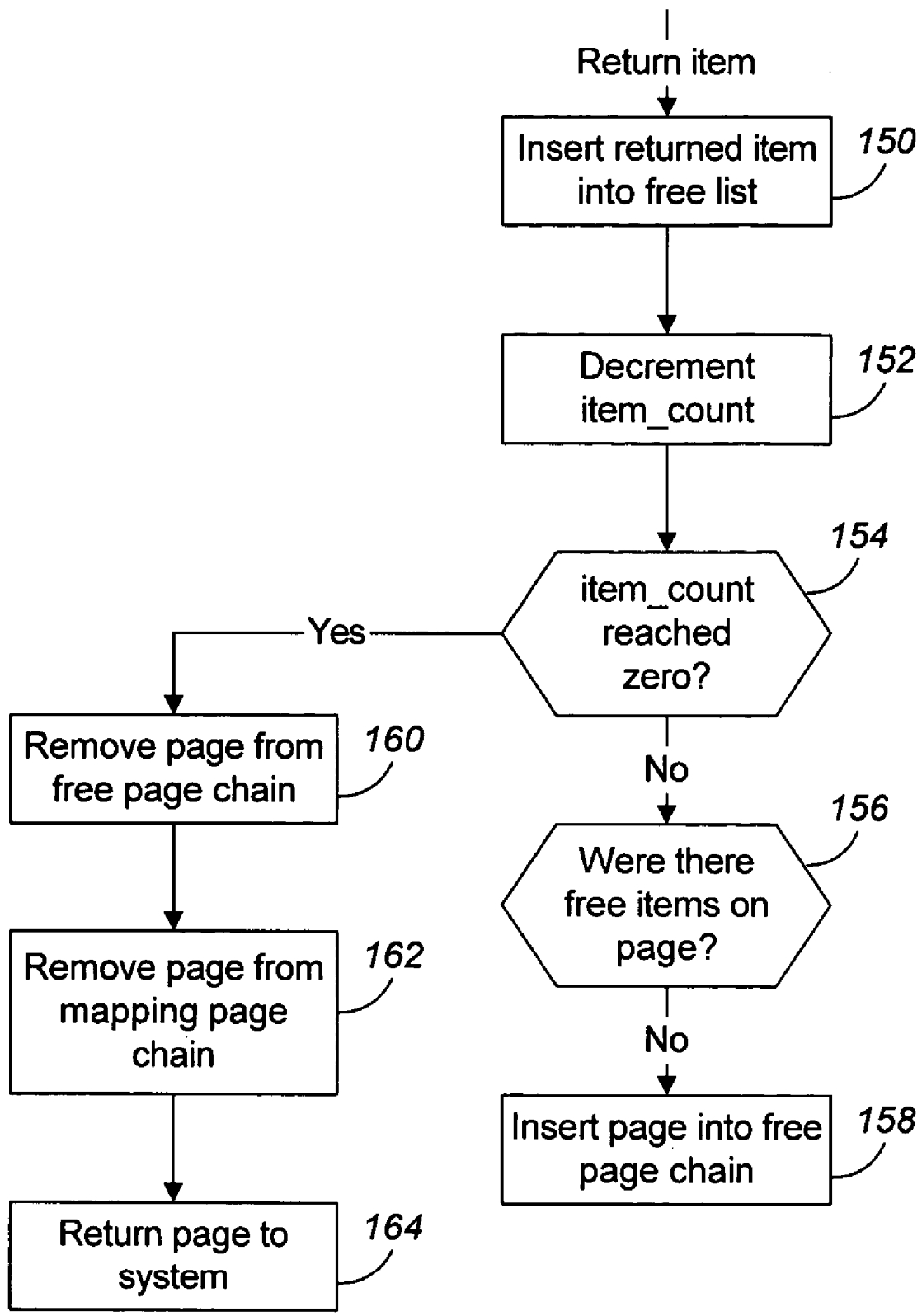
FIG. 1C shows a method for returning an item to a mapping chain.

When a data object is deleted, the corresponding mapping item can be returned to the mapping chain for reuse. FIG. 1C illustrates one method of doing so, which operates on a mapping chain having the structure described in reference to FIG. 1A.

The item being return is added to the free list (150). That is, the value in free_offset is stored in the returned item, and then free_offset is set to point to the returned item. The item_count is decremented (152). If all the items on the page are free (item_count reached zero) ("yes" branch of decision 154), the page can be (but need not be) returned to the system. To do so, the page is removed from the free page chain (160) by updating the pointers free_next, free_prev, and map_free as appropriate. The page is also removed from the mapping page chain (162) by updating the pointers map_next, map_prev, map_first, and map_last as appropriate. Then the page is returned to the system (164). If the returned item is the first free item on the page ("no" branch from decision 154; "no branch from decision 156), the page is inserted into the free page list by updating the pointers free_next, free_prev, and map_free as appropriate (158).

In the following paragraphs, methods for performing common database operations using a mapping chain will be described.

Figure 2:
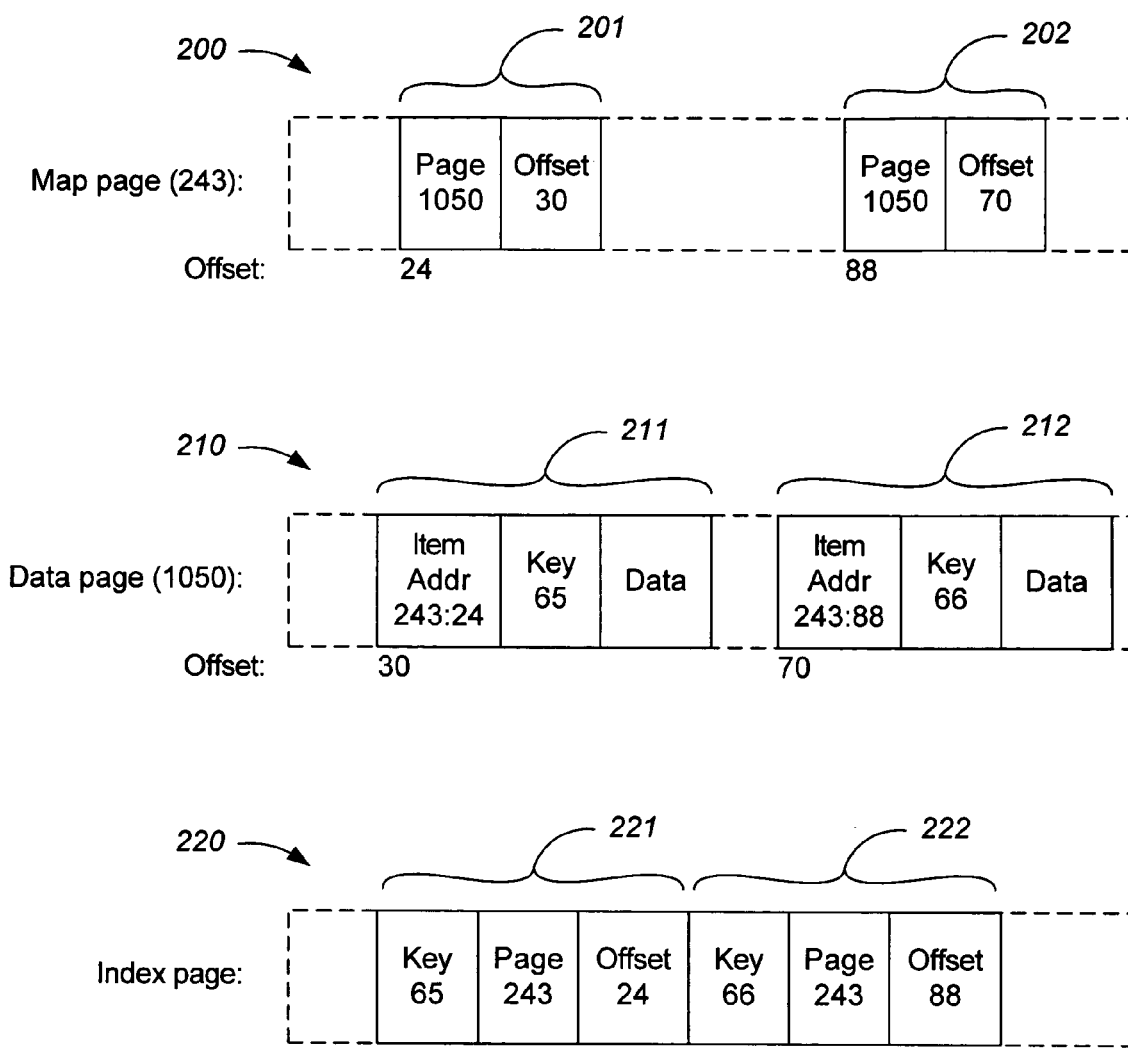
FIG. 2 is a block diagram illustrating a mapping page, data page, and index page having related entries.

Data objects can be accessed from an index. An index of data objects will contain, as identifiers of data objects, physical pointers into the mapping chain. In the implementation illustrated in FIG. 2, each of these pointers is made up of a page identifier and an offset within the page, e.g., map page 200 (page "243"). The index page 220 is illustrated with an index 221 for key value "65" and an index 222 for key value "66", which points to mapping items 201, 202 on page "243" with offset "24" and on page "243" with offset "88", respectively. The page-offset pairs—denoted, e.g., "243:88"—are logical identifiers for the actual data objects 211, 212, which are on data page 210 (page "1050") at offsets "30" and "70", respectively, as recorded in the corresponding mapping items 201, 202.

Figures 3A, 3B:
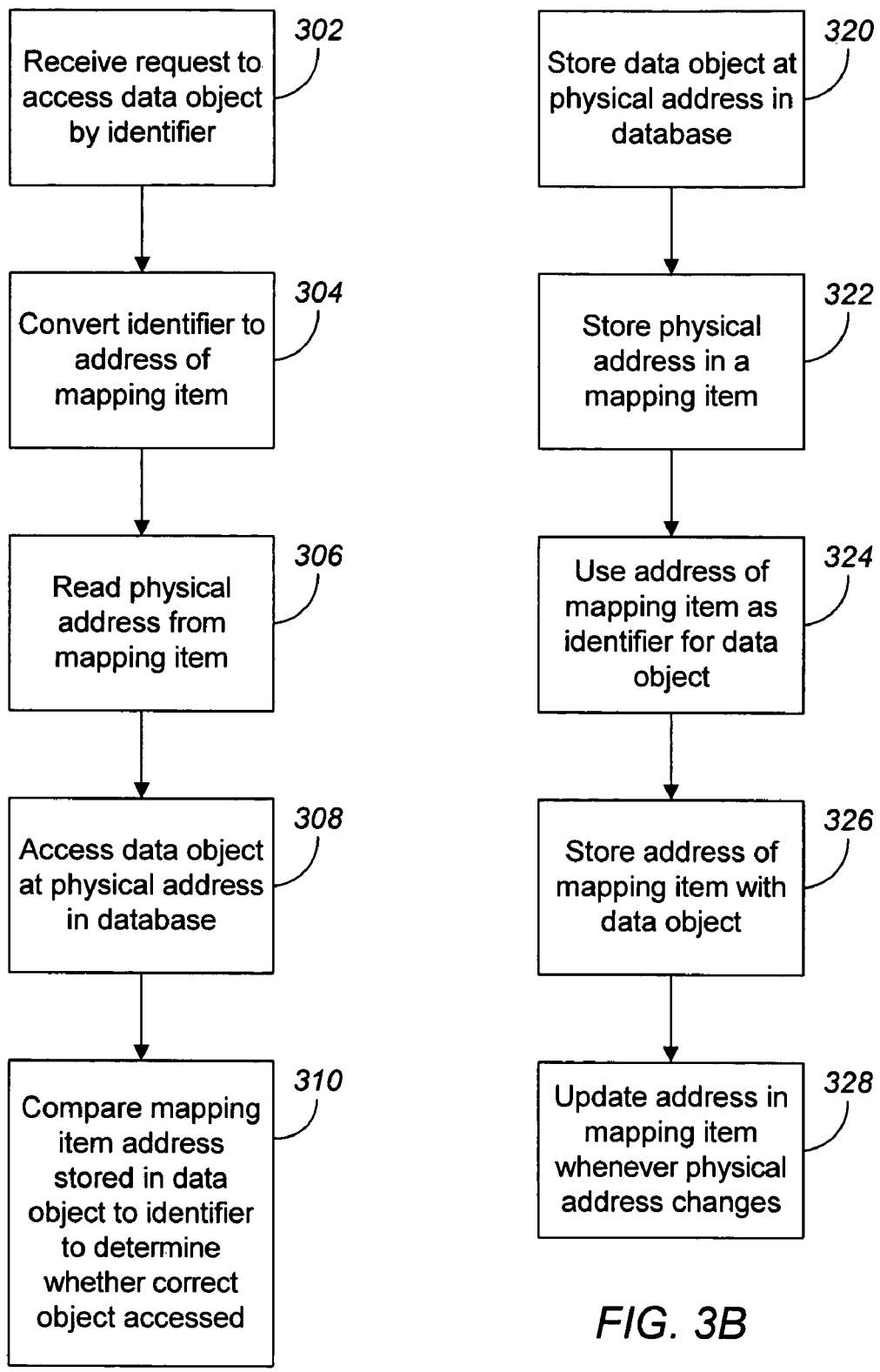
FIG. 3A shows a method for accessing a data object.
FIG. 3B shows a method for adding a new data object to a database.

Thus, as shown in FIG. 3A, to access a data object using an index, a system obtains an identifier for the data object from the index (302). This identifier may be the physical address of a mapping item in a mapping chain, or it may have to be resolved into a mapping item address (304), as described below, for example, in reference to bitmap indices. The system then reads the physical address of the data object, which is stored in the mapping item, from the mapping item (306), and accesses the data object directly using the physical address obtained from the mapping item (308). The cost of this operation is one page access to the mapping chain page. Optionally, if a mapping item address was stored with the data object, this stored address is compared with the mapping address used to access the data object to determine whether the correct data object was accessed (310).

FIG. 3B shows a method of adding a new data object to the database. The new data object is (or will be) stored at a physical address in the database (320). The system gets a mapping item, e.g., as described in reference to FIG. 1B, and stores the physical address of the new data object in the mapping item (322). The system uses the address of the mapping item, which may be the address of the item in a mapping chain, as the identifier for the new data object (324). In particular, in the implementation described above, the system writes the mapping chain address of the mapping item as a data object identifier in any indices referring to the object and in the data object or otherwise as metadata identifying the data object. In most cases, the cost of this operation is only one page access. Optionally, the system can store the address of the mapping item, i.e., the identifier, with the data object (326). Whenever the data object is moved, the system updates the physical address stored in the mapping item to be the new physical address of the data object (328).

When deleting a data object physically from the database, a system will free the corresponding mapping item, e.g., as described in reference to FIG. 1C. In most cases, the cost of this operation is one page access.

When a system physically moves a data object in the database, the system will update the physical address stored in the corresponding mapping item to the new address of the data object. The cost of this operation is one page access.

When a system splits a page with data objects—e.g., because the page is low on space—the system will update the physical addresses stored in the corresponding mapping items to the new address of the data objects that moved to other pages. In the worst case, the cost of this operation is one page access for each moved data object; however, in the common situation where data objects were allocated in order, only a few page accesses to the mapping chain will be required.

Finally, the mapping chain can be compacted. In particular, a garbage collector that compacts the database itself can compact the mapping chain as well. This can be done as follows. While running over data pages, the system builds a new mapping chain and updates the data object identifiers to point to the new mapping chain pages. The system records the mapping from old to new data object identifiers in memory. Then, using the recorded information, it updates all indices to point to the new mapping chain. If data objects contain references to other data objects, the system updates them as well. When done, the system removes the old mapping chain.

Indices have been described as storing a logical address (the physical address of the mapping entry, not of the data object itself). However, it can be advantageous to store both the physical address and a logical address of a data object in an index. If this is done, a system using a mapping chain can take a shortcut using physical addresses stored in an index instead of doing indirect access over a mapping chain. This system will operate successfully even if the system allows a data object to be moved without keeping the physical address in the index absolutely current. This may improve performance of a database lookup operation. In this alternative, the physical address stored in the index is tried first, and if the data object is not found at this address, the access is retried using the logical address, which is implemented using a mapping chain. If the data object is found using the logical address, the physical address in the index is updated with the correct physical address of the data object.

Figure 3C:
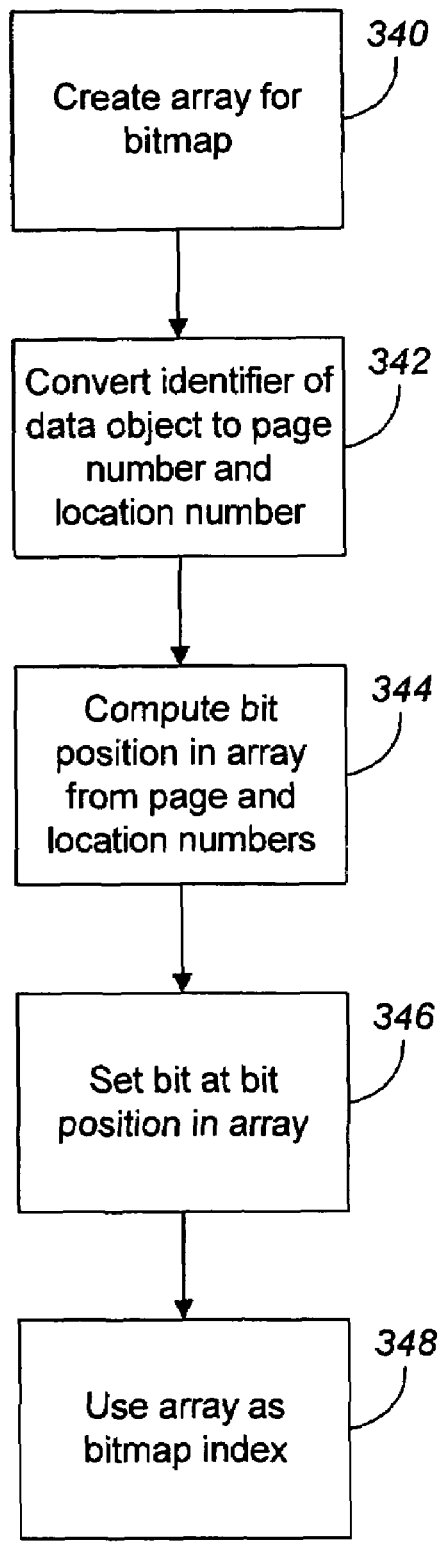
FIG. 3C shows a method for creating a bitmap index.

As illustrated in FIG. 3C, mapping chain data can be used to create bitmap indices. An array for the index is created (340). The identifier (address of the mapping item) for each data object in the database is converted into a bit position (342). One efficient arrangement for this purpose is to have the mapping item address be a zero-based page identifier (a page number within the mapping chain) and an offset within the page. If the actual page identifier is not zero based, a zero-based page identifier (i.e., a page number in a sequence of consecutive numbers) can be generated while building the bitmap index by creating a temporary lookup table mapping each newly-encountered mapping chain page identifier to the next page number in sequence, starting with zero.

The offset can be, or can be converted to be, an offset number, i.e., a number that denotes the position in sequence of the mapping item in the mapping page. Depending on the layout of the mapping page, this can be calculated easily (for example, subtracting base offset and dividing by item size) or it can be determined from a lookup table. In any event, the system generates a unique object number by multiplying the page number by the maximum possible offset number for a mapping page, and then adding the offset number of the mapping item. (Advantageously, the range of offset numbers is from zero to one less than the maximum number of mapping items on a mapping page, and the range of page numbers is from zero to one less than the number of mapping pages.)

The object number uniquely determines a bit position in the array (344). The presence of the data object in the index is indicated by the setting (alternatively, the clearing) of the bit in the array at the bit position (346). With bits set (or cleared) for all data objects in the set represented by the bitmap array, the array can be used for bitmap index operations (348). After finishing bitmap index operations, the system can look up resulting data objects by inversely computing the mapping item addresses from locations in the bit array that have an associated bit set (or cleared). To do so, the system can use a temporary lookup array built when building the bit array.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, different addressing techniques for the database or for items within a mapping page can be used, such as generating item addresses that are independent of the mapping page identifier. Accordingly, other embodiments are within the scope of the following claims.

What is claimed is:

1. A machine-readable medium, having instructions stored thereon, which, when executed by a processor of a data processing apparatus, cause the data processing apparatus to:

store a plurality of data objects at a plurality of database physical addresses in a database managed by a database management system, wherein one of the plurality of database physical addresses differs from a corresponding one of a plurality of hardware physical addresses, wherein the plurality of hardware physical addresses are managed by data storage hardware;

store the plurality of database physical addresses in a plurality of mapping items, the plurality of mapping items located at a plurality of mapping item addresses;

store a first mapping item address of the plurality of mapping item addresses with a corresponding data object of the plurality of data objects;

store a logical identifier for the corresponding data object along with a corresponding database physical address of the corresponding data object in a corresponding one of the plurality of mapping items;

store the plurality of mapping items in a plurality of mapping pages, wherein one of the plurality of mapping item addresses is made up of a page identifier for a corresponding mapping page of the plurality of mapping pages and a location within the corresponding mapping page;

convert the page identifier and the location to a bit position and set a bit at the bit position in a bit array;

use the bit array as a bitmap index;

store the plurality of mapping pages in a mapping chain;

identify a selected data object of the plurality of data objects using a corresponding one of the plurality of mapping item addresses; and access the selected data object having been identified using a single page access to the plurality of mapping pages.

2. The machine-readable medium of claim 1, further having stored thereon instructions that when executed cause data processing apparatus to:

update a first database physical address of the plurality of database physical addresses stored in one of the plurality of mapping items whenever the first database physical address of a corresponding one of the plurality of data objects in the database changes.

3. The machine-readable medium of claim 1, wherein the selected data object is a row in a database table, the instructions further causing data processing apparatus to:

store a corresponding mapping item address of the plurality of mapping item addresses in a field in the row.

4. The machine-readable medium of claim 1, wherein:
the mapping chain comprises a chain structure of the plurality of mapping pages, each mapping page providing a fixed number of mapping item locations; and
the mapping chain further comprises metadata for the chain structure.

5. The machine-readable medium of claim 4, further having recorded thereon instructions that when executed cause data processing apparatus to:
generate a bitmap for a set of the plurality of data objects by converting an identifier for each data object in the set to a bit position in a bit array.

6. The machine-readable medium of claim 1, further having recorded thereon instructions that when executed cause data processing apparatus to:
determine whether an accessed data object is a correct data object by comparing a first mapping item address stored with the accessed data object to a second mapping item address of an identifier of the data object.

7. A system including a processor for executing instructions, said instructions, when executed, for providing access to data objects, the system comprising:
data storage hardware that manages a plurality of hardware physical addresses;
a database management system that manages a plurality of data objects at a plurality of database physical addresses in a database, wherein one of the plurality of database physical addresses differs from a corresponding one of the plurality of hardware physical addresses; and
a computer program that when executed causes data processing apparatus to:
store the plurality of database physical addresses in a plurality of mapping items, the plurality of mapping items located at a plurality of mapping item addresses,
store a first mapping item address of the plurality of mapping item addresses with a corresponding data object of the plurality of data objects;
store a logical identifier for the corresponding data object along with a corresponding database physical address of the corresponding data object in a corresponding one of the plurality of mapping items;
store the plurality of mapping items in a plurality of mapping pages, wherein one of the plurality of mapping item addresses is made up of a page identifier for a corresponding mapping page of the plurality of mapping pages and a location within the corresponding mapping page;
convert the page identifier and the location to a bit position and set a bit at the bit position in a bit array;
use the bit array as a bitmap index;
store the plurality of mapping items in a plurality of mapping pages,
generate a bitmap for a set of the plurality of data objects by converting an identifier for each data object in the set to a bit position in a bit array,
store the plurality of mapping pages in a mapping chain,
identify a selected data object of the plurality of data objects using a corresponding one of the plurality of mapping item addresses, and
access the selected data object using a single page access to the plurality of mapping pages.

8. The system of claim 7, wherein the plurality of data objects are rows in a database table, the system further comprising:
means for storing a plurality of mapping item addresses in a field in the corresponding rows.

9. The system of claim 7, wherein:
each mapping page of the plurality of mapping pages provides a fixed number of mapping item locations.

10. The system of claim 7, wherein the computer program further causes data processing apparatus to:
update a first database physical address of the plurality of database physical addresses stored in one of the plurality of mapping items whenever the first database physical address of a corresponding one of the plurality of data objects in the database changes.

* * * * *